(12) United States Patent
Burgan et al.

(10) Patent No.: US 6,445,790 B1
(45) Date of Patent: *Sep. 3, 2002

(54) DIGITAL TONE GENERATOR

(75) Inventors: John M. Burgan, Palm Beach, FL (US); James H. Carlquist; John R. Oakley, both of Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 102 days.

This patent is subject to a terminal disclaimer.

(21) Appl. No.: 09/650,411

(22) Filed: Aug. 29, 2000

Related U.S. Application Data (63) Continuation of application No. 09/086,628, filed on May 29, 1998.

(51) Int. Cl.[7] .............................................. H04M 1/00
(52) U.S. Cl. ..................... 379/361; 379/357.03; 84/600
(58) Field of Search .................................. 379/361, 350, 379/353, 283, 351, 386, 352, 357.03; 84/600, 602, 603, 703, 711; 340/384.7

(56) References Cited

U.S. PATENT DOCUMENTS 6,400,821 B1 * 6/2002 Burgan et al. .............. 379/361

* cited by examiner

*Primary Examiner*—Wing Chan
(74) *Attorney, Agent, or Firm*—Andrew S. Fuller; Phillip P. Macnak (57) ABSTRACT

A digital tone generator (1110) includes a digital signal generator (1138) which generates a digital waveform data sequence which is representative of a tone having a predetermined waveform, and an adaptive duty cycle pulse-width modulator (1132) which is responsive to the digital waveform data sequence for generating an an adaptive duty cycle period characterized by a pulse-width modulated digital tone signal having a variable frequency and duty cycle which is generated by selecting a variable number of clock pulses of a predetermined reference clock (31).

19 Claims, 10 Drawing Sheets

DIGITAL TONE GENERATOR

CROSS REFERENCE TO RELATED APPLICATION

This application is a continuation of U.S. patent application Ser. No. 09/086,628 entitled "Digital Tone Generator" filed May 29, 1998, the entire disclosure of which is incorporated by reference herein.

FIELD OF THE INVENTION

This invention relates in general to multi-frequency tone generators, and more specifically to a digital tone generator capable of generating digital multi-frequency tones, including digital dual tone multi-frequency tones (DTMF) which are readily converted into analog tone signals.

BACKGROUND OF THE INVENTION

Historically, oscillators that could be used for frequency generation were based on resonant circuits that used inductors and capacitors. These types of oscillators were used in early DTMF circuits, but to get frequencies that were stable enough and that did not drift, the inductors and capacitors needed to be expensive high grade parts. Advances in crystal oscillator technology made the oscillators more stable and less costly. Crystal oscillators and simple frequency dividers became more common as frequency generation circuits. Such circuits became the basis for tone generation required to generate alert tones in many electronic devices, such as selective call receivers and pagers.

DTMF signaling, as commonly used in electronic tone dialing, represents a telephone number encoded as a combination of high and low band frequencies corresponding to each digit of the telephone number. For example, the digit 2 is represented by combining a low band frequency of 770 Hz with a high band frequency of 1336 Hz. Each telephone number digit will therefore have a unique combination of a low band frequency and a high band frequency, to thereby form the DTMF signal.

The DTMF signal must have low distortion in order for the Central Telephone Office to determine the proper telephone number being dialed. Increased distortion of the DTMF signal is more likely to occur if the signal is transmitted from a transducer into the telephone microphone instead of by direct electrical connection to the phone line.

Figure 1:
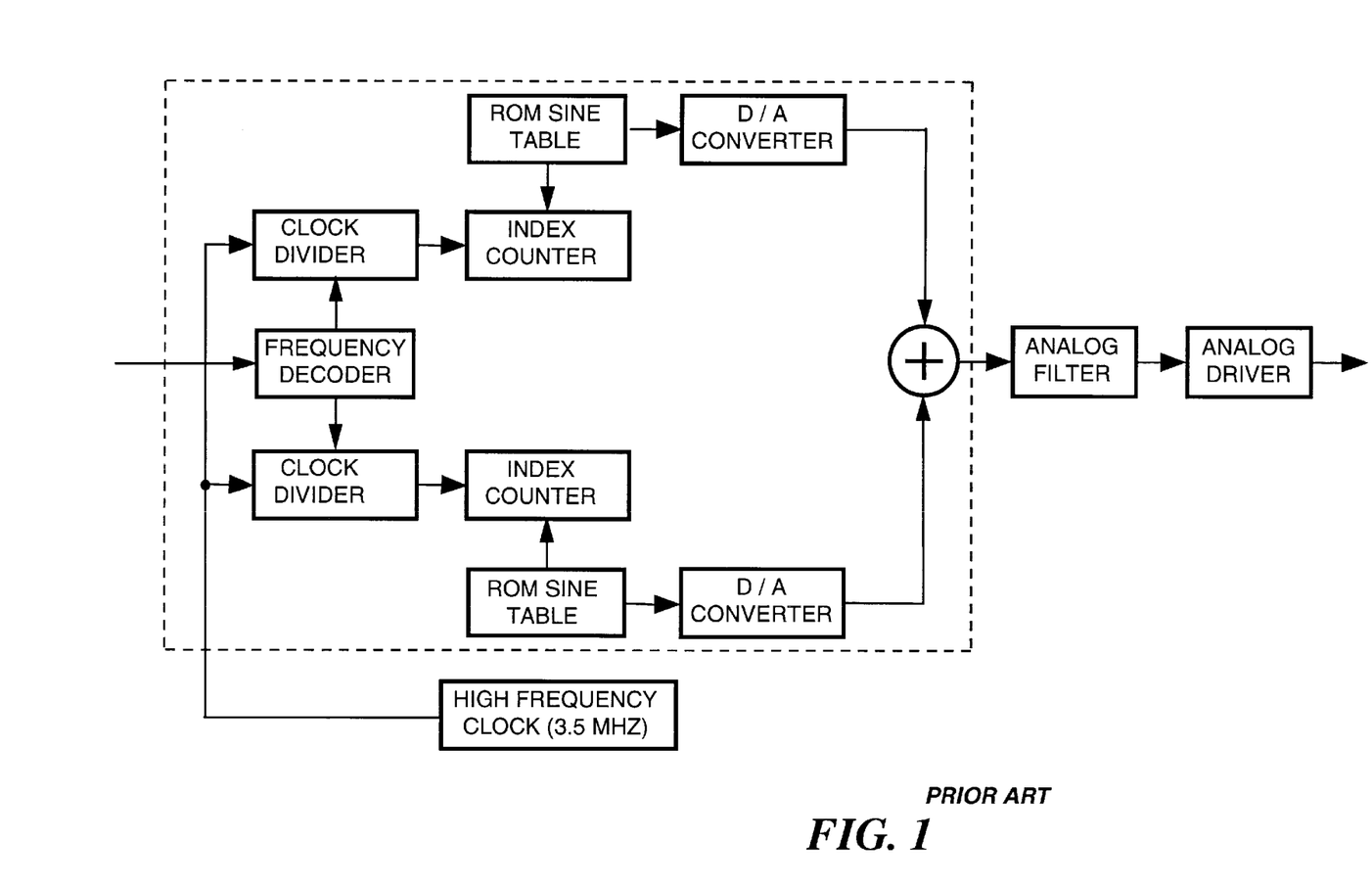
FIG. 1 is an electrical block diagram of a prior art DTMF tone signal generator.

To generate DTMF signaling, two analog sine waves are required. Due to the frequency accuracy required, this is usually done by starting with a high frequency crystal oscillator, such as having a typical operating frequency of 3.5 MHz, as shown in FIG. 1. The high frequency oscillator is divided down by a clock divider and fed to an index counter. The index counter generates a repeating modulo count which is connected to a read only memory (ROM) which feeds a digital to analog (D to A) converter. The ROM contains a sine wave table, so as the modulo count generated by the index counter is incremented, the D to A converter produced a sine wave output. The frequency of the sine wave would be adjusted by changing the divide ratio of the clock divider between the high frequency crystal oscillator and the index counter. The clock divider is changed by loading the divide ratio directly, or by way of a frequency decoder which generates the desired divide ratio from a frequency selection input. Two clock dividers with different divide ratios, two index counters, and two D to A converters were required to generate two sine waves at different frequencies. Once the two analog sine waves have been generated, they were combined together. The combined signal was then coupled to an analog filter to smooth out any transitions caused by the digital generation of the sine waves. The output of the analog filter was delivered to a analog driver circuit, and then to either a phone line or a speaker. A commercially available integrated circuit which operates as described above is manufactured by Signetics Corporation of Sunnyvale, Calif., the Signetics PCD3311. The D to A converters and low pass filters which were used in prior art integrated circuit technology generally required complex circuits which typically increased die size and cost.

Figure 2:
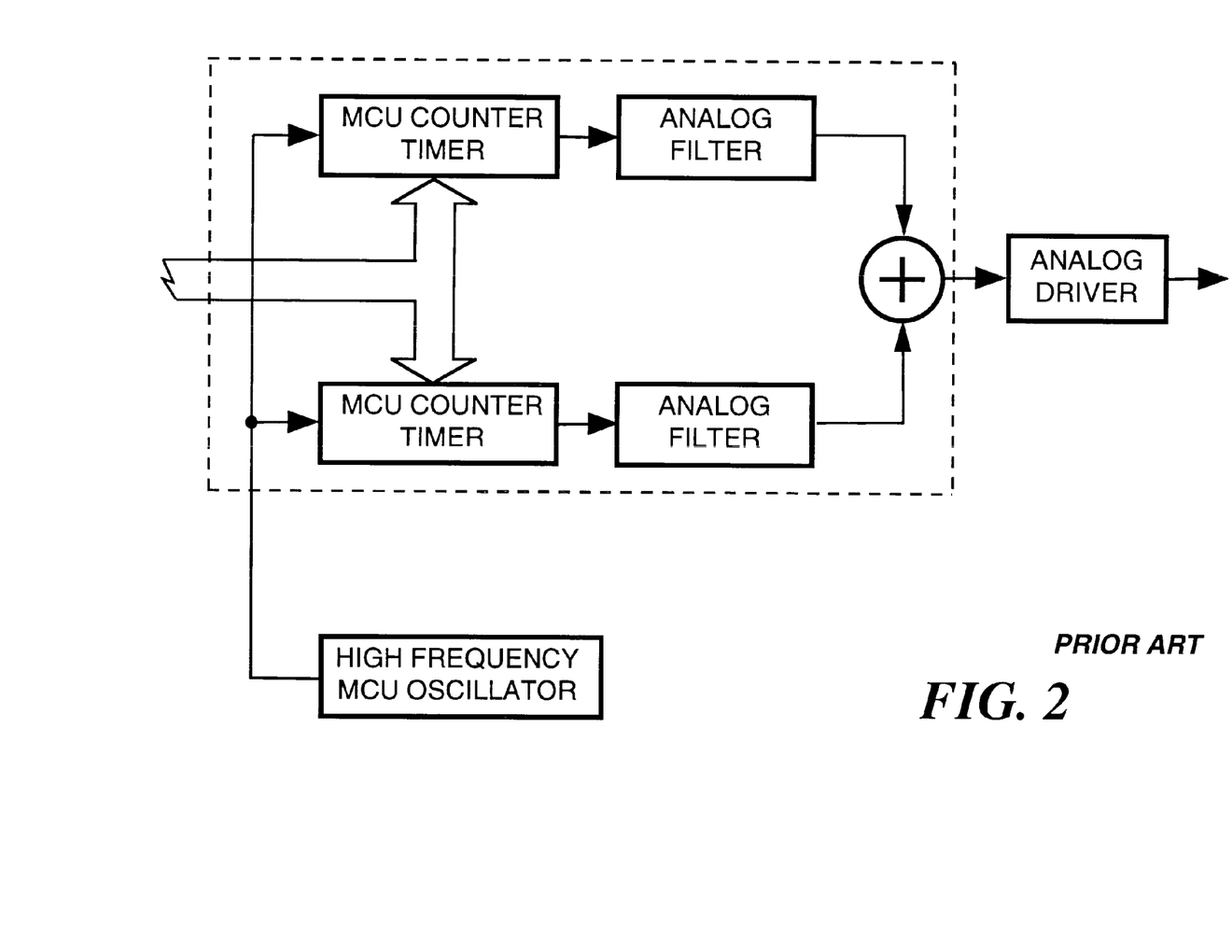
FIG. 2 is an electrical block diagram of another prior art DTMF tone signal generator.

A less common method for producing DTMF signaling was used with limited success in selective call receivers and pagers. This less common method generated two square wave signals at low and high frequencies corresponding to the DTMF tones desired using two digital timer circuits commonly available on commercial microprocessors, as shown in FIG. 2. The frequencies of the square wave signals were set by loading values into the MCU counter/timers over the data bus. The MCU counter/timers were clocked at the frequency of the MCU oscillator, and the resultant square wave signals generated were then filtered using analog filter circuitry to generate the desired low and high frequency DTMF tones, which were then added together with another analog circuit. Once added together, the combined signal was fed to an analog driver circuit. Analog filtering that could transform the square waves into sine waves of low enough distortion for use as DTMF tones were relatively expensive and difficult to design, considering the low voltages available within a pager. The analog driver circuit was also typically expensive and increased power requirements within the pager.

Pulse-width modulation technology has been used for volume control of alerts, such as in pagers. Prior art technology chopped the audio alert signal with a high frequency signal to control the volume level of the alert. The prior art technology used the modulation only to adjust the volume level of the alert, and the modulation was not used to create or vary the waveform of the audio signal. The pulse-width of the modulation was generally fixed. While this method of pulse-width modulation is considered adequate for many operational conditions, it is not without need of improvement for DTMF application.

Fractional dividers were also introduced into pagers to generate audio alert tones (less than 4 KHz) from a low frequency oscillator, typically 32 KHz. The tones generated by the fractional dividers were generally not suitable for use in DTMF circuits due to the jitter and distortion inherent in their generation.

Music synthesizers were originally designed using a series of inductor/capacitor oscillators that could be mixed with each other using analog circuitry to generate various frequency waveforms with various attack and decay envelopes. The complexity and cost of these analog circuits have always been too expensive to implement in low cost products, such as pagers. The advances in crystal oscillators and digital technology have allowed increasingly more complex circuits to be implemented in low cost products. However, the analog waveforms derived by conventional tone generating circuits were not easily changed to control the attack and decay envelopes necessary for music synthesizers, and can not be directly transferred to digital circuitry without maintaining some expensive digital to analog converter and driver circuitry.

Thus what is needed is an apparatus for use in electronic devices for generating tones, especially those electronic devices which operate from a single cell battery.

What is also needed is an apparatus for use in electronic devices for generating tones, especially for generating tones which are used to provide an audible alert.

What is also needed is an apparatus for use in electronic devices for generating tones, especially for generating tones which are used to provide an audible melody alert.

What is also needed is an apparatus for use in electronic devices for generating an all digital waveform that can readily be transformed into an analog signal.

What is also needed is an apparatus for use in electronic devices that will generate an all digital waveform and that will function and sound essentially the same as the more expensive analog circuitry.

What is also needed is an apparatus for use in electronic devices that can simply and effectively control the envelope of a digital tone generator to provide the tonal qualities of a musical instrument.

What is also needed is an apparatus for use in electronic devices for generating tones, especially for generating DTMF tones which are used to acoustically dial a telephone number.

The above and other features and advantages of the present invention will be better understood from the following detailed description taken in conjunction with the accompanying drawings.

SUMMARY OF THE INVENTION

In accordance with one aspect of the present invention, a digital tone generator comprises a digital signal generator which generates a digital waveform data sequence which is representative of a tone having a predetermined waveform, and a pulse-width modulator which is responsive to the digital waveform data sequence for generating a pulse-width modulated digital tone signal.

A further aspect of the present invention is the digital tone generator which further comprises a low pass filter which is responsive to the pulse-width modulated digital tone signal for generating an analog tone signal.

In accordance with another aspect of the present invention, a digital DTMF tone generator comprises a first digital signal generator which generates a first digital waveform data sequence which is representative of a high DTMF tone having a predetermined waveform, and a second digital signal generator which generates a second digital waveform data sequence which is representative of a low DTMF tone having a predetermined waveform. A digital adder adds the first digital waveform data sequence and the second digital waveform data sequence to derive composite DTMF tone data. A pulse-width modulator next encodes the composite DTMF tone data sequence to generate pulse-width modulated DTMF tone data.

A further aspect of the present invention is the digital DTMF tone generator which comprises a low pass filter which is responsive to the pulse-width modulated DTMF tone data for generating an analog DTMF tone signal.

A still further aspect of the present invention is an adaptive pulse-width modulator for pulse-width modulating a digital tone signal. The adaptive pulse width modulator comprises an index table which stores a table of on-state counter values and off-state counter values which are selected in accordance with the digital tone signal. A selection circuit is responsive to a mode selection signal for alternately selecting an on-state counter value and off-state counter value selected from the table of on-state counter values and off-state counter values by the digital tone signal.

A counter is responsive to a reference clock for providing a count representing the on-state counter value and off-state counter value selected, and in response thereto generates an end-of-count signal. A mode selector is responsive to the end-of-count signal for generating the mode selection signal, and the mode selector also delivers a pulse-width modulated digital tone signal.

DESCRIPTION OF THE PREFERRED EMBODIMENT

Figure 3:
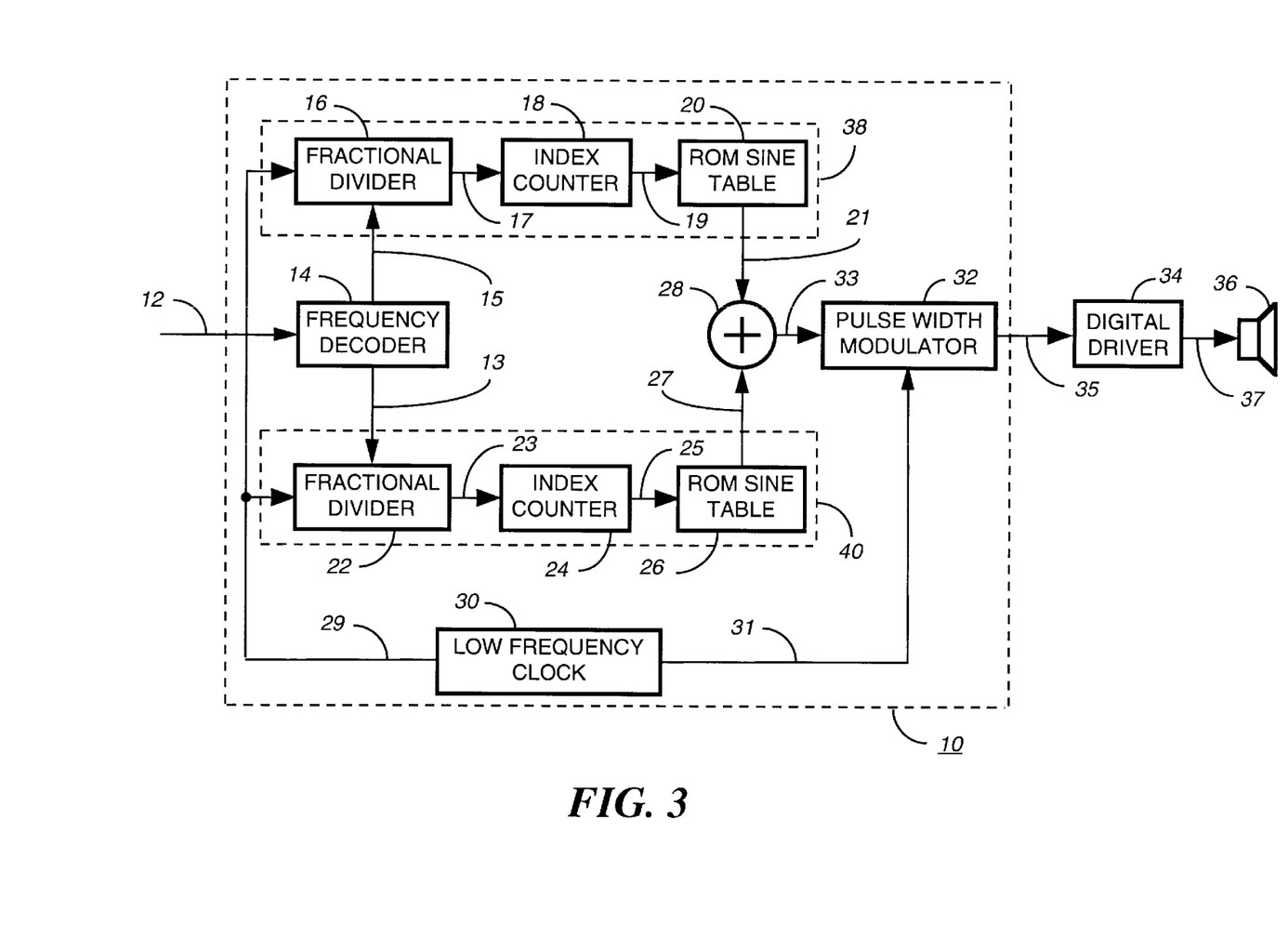
FIG. 3 is an electrical block diagram of a DTMF signal generator in accordance with the present invention.
Figure 4:
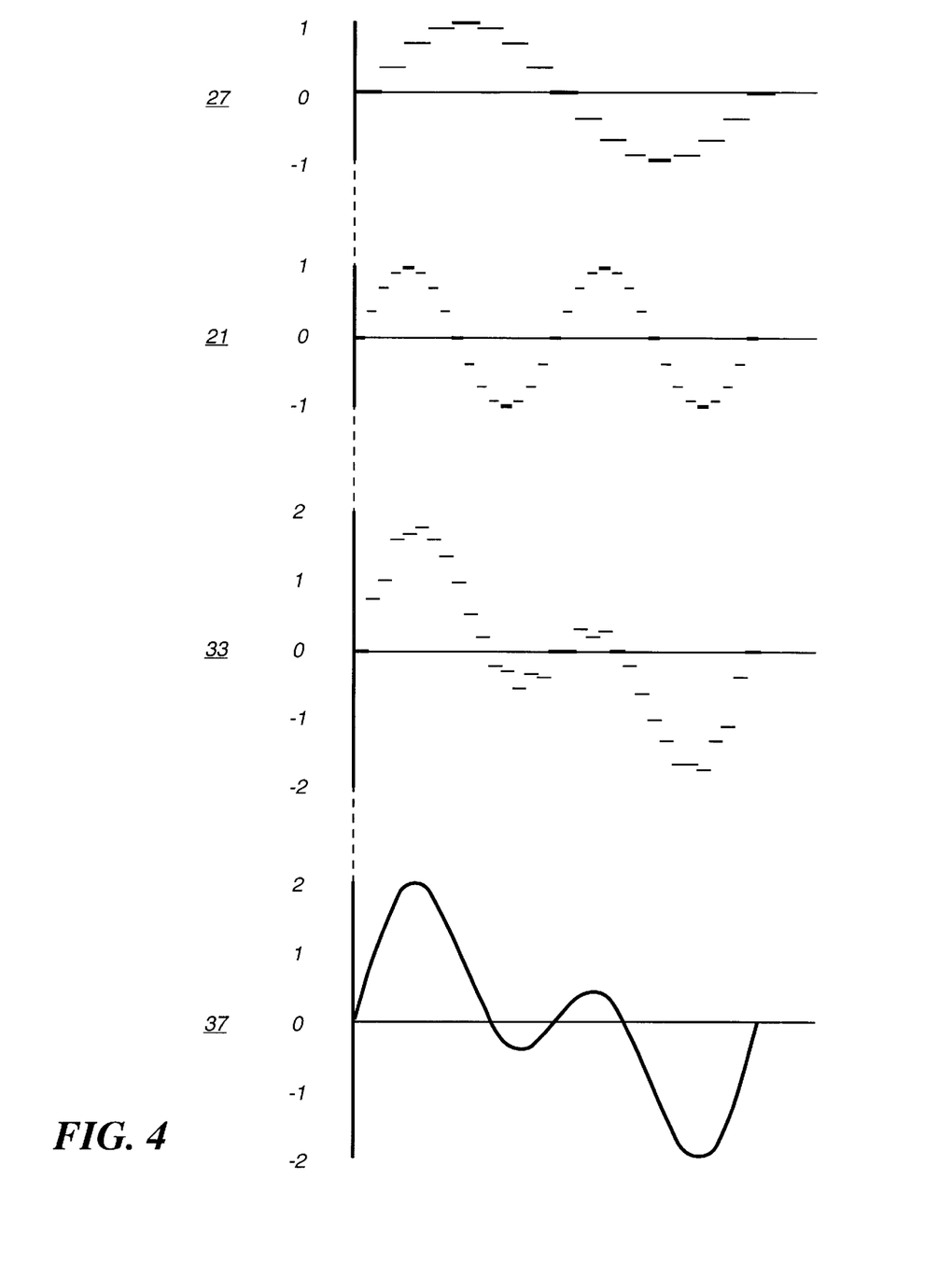
FIG. 4 is a timing diagram depicting an operation of the DTMF signal generator in accordance with the present invention.

FIG. 3 shows a block diagram of a digital DTMF tone generator 10 in accordance with the present invention. To simultaneously generate the two DTMF tone frequencies required for each telephone number digit, a high tone generator 38 and a low tone generator 40 produce digitized representations of the DTMF tones. A reference clock signal 29 operating by way of example at 614.4 kilohertz (KHz) is used as a time base for the digital DTMF tone generator 10, and is applied to the inputs of the high tone generator 38 and the low tone generator 40, respectively. The reference clock signal 29 is applied directly to a fractional divider 16 of the high tone generator 38 and to a fractional divider 22 of the low tone generator 40. The fractional divider 16 and the fractional divider 22 run at two different divide ratios and are used to divide down the reference clock signal 29 to generate two index clocks. A micro-controller (not shown) supplies a frequency select signal 12 to the fractional divider 16 and the fractional divider 22 for programming the divide ratios required to generate the proper DTMF tone frequencies at the outputs of the fractional dividers. The fractional divider 16 and the fractional divider 22 generate index clock 17 and index clock 23, respectively, which are applied to index counter 18 and index counter 24. Index counter 18 and index counter 24 are preferably 5-bit modulo counters which generate a first predetermined sequence of addresses 19, otherwise referred to as a high frequency address sequence 19 and a second predetermined sequence of addresses 25, otherwise referred to as a low frequency address sequence 25 which are used to access a ROM sine table 20 and a ROM sine table 26, respectively, which are stored in a read-only memory (ROM). ROM sine table 20, as it is addressed, generates a first digital waveform data sequence 21, which is by way of example a 5-bit binary data word representing amplitude levels for a digitized high frequency sine wave signal, such as depicted in FIG. 4; and ROM sine table 26, as it is addressed, also generates a second digital waveform data sequence 27, which is by way of example a 5-bit binary data word representing amplitude levels for of a digitized low frequency sine wave signal, such as depicted in FIG. 4. The ROM sine table data is shown by way of example in Table 1 below.

TABLE I

| Address | | Angle | Sine | Data | | |
|---|---|---|---|---|---|---|
| Decimal | Hex | Degrees | Level | Decimal | Hex | Binary |
| 0 | 0 | 5.625 | .098 | 17 | 11 | 10001 |
| 1 | 1 | 16.875 | .290 | 20 | 14 | 10100 |
| 2 | 2 | 28.125 | .471 | 23 | 17 | 10111 |
| 3 | 3 | 39.375 | .634 | 25 | 19 | 11001 |
| 4 | 4 | 50.625 | .773 | 27 | 1B | 11011 |
| 5 | 5 | 61.875 | .882 | 29 | 1D | 11101 |
| 6 | 6 | 73.125 | .957 | 30 | 1E | 11110 |
| 7 | 7 | 84.375 | .995 | 31 | 1F | 11111 |
| 8 | 8 | 95.625 | .995 | 31 | 1F | 11111 |
| 9 | 9 | 106.875 | .957 | 30 | 1E | 11110 |
| 10 | A | 118.125 | .882 | 29 | 1D | 11001 |
| 11 | B | 129.375 | .773 | 27 | 1B | 11011 |
| 12 | C | 140.625 | .634 | 25 | 19 | 11001 |
| 13 | D | 151.875 | .471 | 23 | 17 | 10111 |
| 14 | E | 163.125 | .290 | 20 | 14 | 10100 |
| 15 | F | 174.375 | .098 | 17 | 11 | 10001 |
| 16 | 10 | 185.625 | −098 | 14 | E | 01110 |
| 17 | 11 | 196.875 | −.290 | 11 | B | 01011 |
| 18 | 12 | 208.125 | −.471 | 8 | 8 | 01000 |
| 19 | 13 | 219.375 | −.634 | 6 | 6 | 00110 |
| 20 | 14 | 230.625 | −.773 | 4 | 4 | 00100 |
| 21 | 15 | 241.875 | −.882 | 2 | 2 | 00010 |
| 22 | 16 | 253.125 | −.957 | 1 | 1 | 00001 |
| 23 | 17 | 264.375 | −.995 | 0 | 0 | 00000 |
| 24 | 18 | 275.625 | −.995 | 0 | 0 | 00000 |
| 25 | 19 | 286.875 | −.957 | 1 | 1 | 00001 |
| 26 | 1A | 298.125 | −.882 | 2 | 2 | 00010 |
| 27 | 1B | 309.375 | −.773 | 4 | 4 | 00100 |
| 28 | 1C | 320.625 | −.634 | 6 | 6 | 00110 |
| 29 | 1D | 331.875 | −.471 | 8 | 8 | 01000 |
| 30 | 1E | 343.125 | −.290 | 11 | B | 01011 |
| 31 | 1F | 354.375 | −.098 | 14 | E | 01110 |

Table I lists a decimal address, a phase angle in degrees, a sine magnitude or value, and decimal data and hex data values. Hex addresses, 0–31 are generated as binary data by the index counter to address the ROM sine table 20 for the high tone generator 38, and the ROM sine table 26 for the low tone generator 40. Sine wave amplitudes are represented by 5-bit binary data which is selected by the hex addresses. The high DTMF tone frequency is determined by the rate at which the ROM sine table 20 is sequentially addressed, and low DTMF tone frequency is also determined by the rate at which the ROM sine table 26 is sequentially addressed. In the present invention, the starting sine phase angle was selected to generate binary data which is symmetrical about the sine wave inflection points of 0, 90, 180 and 270 degrees, thereby simplifying implementation of a hardware based pulse rate modulator. It will be appreciated that other pulse width modulator implementations, such as a software implementation, can utilize data values selected by the ROM sine table addresses which are selected from phase angles beginning at 0 degrees and progressing in 11.5 degree increments over the thirty-two steps. It will also be appreciated that the accuracy of sine wave generation can be increased by increasing the number of data steps, such as sixty-four steps, or decreased by decreasing the number of data steps, such as sixteen.

A digital adder 28 receives the digitized high frequency sine-wave signal 21 derived from the ROM sine table 20 and the digitized low frequency sine-wave signal 27 derived from the ROM sine table 26, and adds the tone data to produce composite DTMF tone data 33 which is depicted as the DTMF frequency signal 33 shown by way of example in FIG. 4, at the output of the digital adder 28. It will be appreciated that the wave forms illustrated in FIG. 4 actually represent signals which are typically generated using a D/A converter, and do not actually represent the composite DTMF tone data 33 which is a 6-bit binary word.

A pulse-width modulator 32, clocked by a reference clock signal 31 derived from the low frequency clock 30, receives the composite DTMF tone data 33 from the digital adder 28, and transforms the composite DTMF tone data 33 into a pulse width modulated signal having a constant amplitude which exhibits a pulse width that varies in accordance with the composite DTMF tone data 33. The manner by which the pulse-width modulator 32 transforms the composite DTMF tone data 33 into pulse-width modulated digital tone signals 35 using the low frequency clock signal will be described in further detail below.

The output of the pulse-width modulator 32 is coupled to a digital driver 34 which processes the pulse width modulated DTMF tone data, providing an output which is suitable to drive a transducer 36. The transducer 36 is preferably an electromagnetic transducer having a limited frequency range. An example of an electromagnetic transducer suitable for use is Model No. GAIKEI-LT01 manufactured by Star Micronics of Japan. The transducer 36 functions as a low pass filter, eliminating high frequency components introduced during the pulse width modulation process. As a result, the transducer 36 generates an analog tone signal 37 which corresponds to the composite DTMF tone data being generated. The analog tone signal 37 is conventionally converted by the transducer 36 into acoustic energy.

Figure 5:
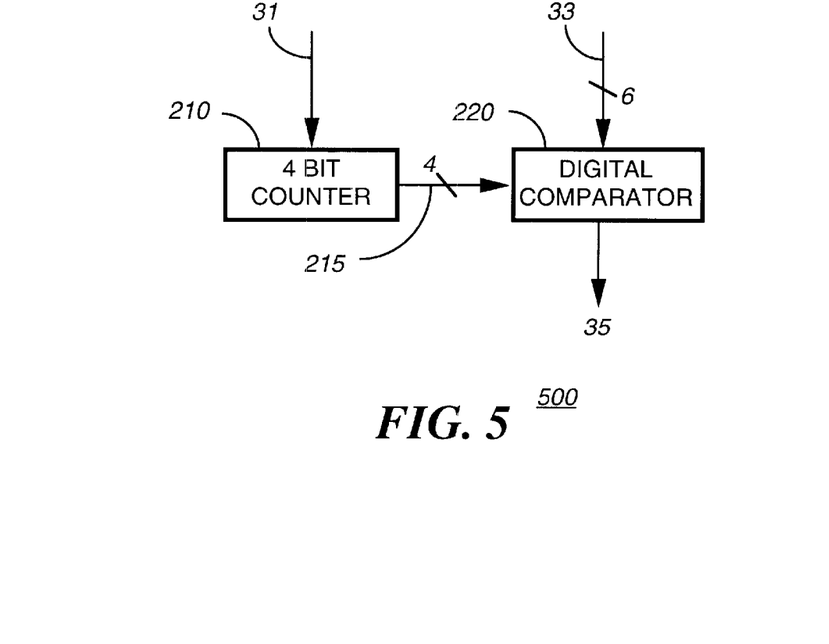
FIG. 5 is an electrical block diagram of conventional pulse-width modulator suitable for implementing aspects of the present invention.

A conventional pulse width modulator 500 suitable for implementing aspects of the digital DTMF tone generator 10 is shown in FIG. 5. In the conventional pulse-width modulator 500, the reference clock signal 31 is applied to a free running 4-bit counter 210 which produces a 4-bit counter value 215 at the output. The reference clock signal 31 is derived from the low frequency clock 30, and can be selected up to a frequency of 614.4 KHz for the low frequency clock described above. The 4-bit counter value 215 is coupled to a digital comparator 220 which also receives the 6-bit composite DTMF tone data 33. The counter 210 continuously counts from 0 to 15 and then back to 0. When the value of the composite DTMF tone data 33 is less than the counter value 215, the output of the digital comparator 220 will be a logical "0", and when the value of the composite DTMF tone data 33 is greater than the counter value 215, the output of the comparator 220 will be a logical "1".

Figure 6:
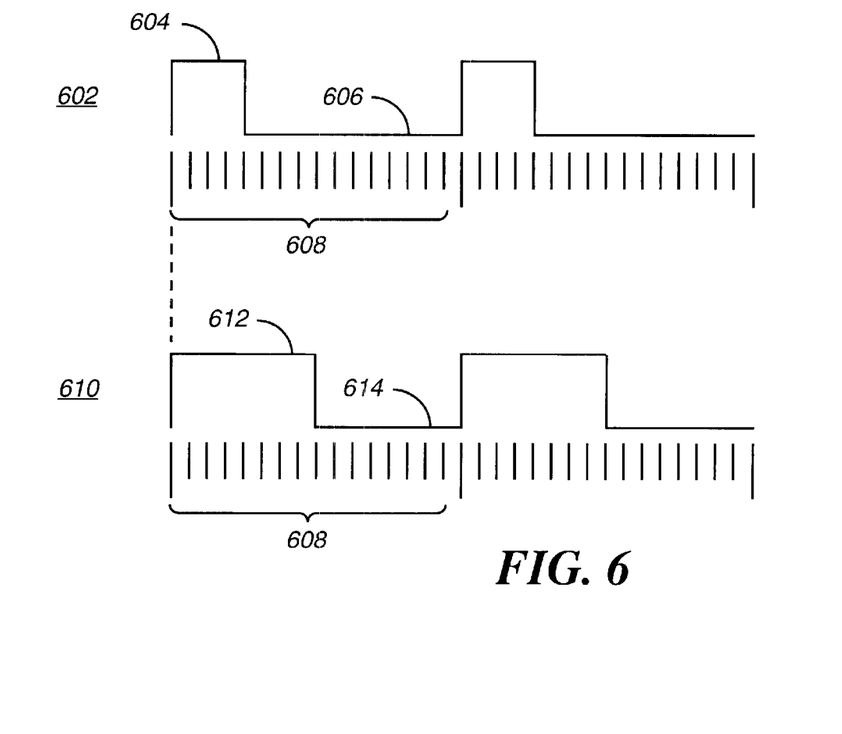
FIG. 6 is a timing diagram illustrating the operation of the pulse-width modulator of FIG. 5.

FIG. 6 illustrates the output states at the pulse-width modulator output as the composite DTMF tone data 33 varies from a desired 25% to 50% duty cycle, and the number of modulation steps is preset at 16 which provides a pulse width resolution of 6.25% per modulation step. It should be understood that the number of modulation steps can be greater than or less then 16, depending upon the pulse width modulation resolution required. Where the overall number of modulation steps 608 is sixteen as shown in FIG. 6, and the composite DTMF tone data 33 corresponds to a modulation value of 25%, the timing diagram 602 illustrates that the pulse-width modulator output will be high for four high level steps for twelve low level steps 606. Furthermore, when the composite DTMF tone data 33 corresponds to a modulation value of 50%, the timing diagram 610 illustrates that the pulse-width modulator output will be high for eight high level steps 612 and low for eight low level steps 614. It will be appreciated in the example provided for a conventional pulse width modulator, that the period of the duty cycle modulation waveform is fixed and can be only changed once every 16 cycles of the reference clock signal 31.

Figure 7:
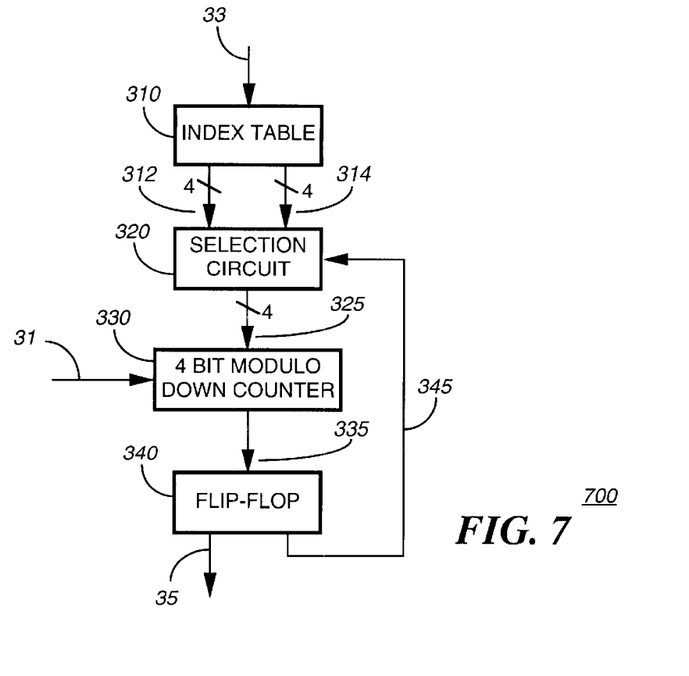
FIG. 7 is an electrical block diagram of an adaptive pulse-width modulator suitable for implementing aspects of the present invention.

An adaptive pulse-width modulator 700 is shown in FIG. 7, which provides adjustment of the number of steps in the period of the duty cycle modulation waveform, thereby minimizing the number of steps in the period of the duty cycle modulation that will provide the correct ratio of high level steps to low level steps. Referring to FIG. 7, the composite DTMF tone data 33 addresses an index table 310 to produce two outputs, NUMON and NUMOFF. The contents of the index table is illustrated by way of example in Table II below.

TABLE II

| Duty Cycle | | | |
|---|---|---|---|
| % | RATIO | NUMON | NUMOFF |
| 0 | 0 | 0 | 16 |
| 6.25 | 1/16 | 1 | 15 |
| 12.5 | 2/16 = 1/8 | 1 | 7 |
| 18.75 | 3/16 | 3 | 13 |
| 25 | 4/16 = 1/4 | 1 | 3 |
| 31.25 | 5/16 | 5 | 11 |
| 37.5 | 6/16 = 3/8 | 3 | 5 |
| 43.75 | 7/16 | 7 | 9 |
| 50 | 8/16 = 1/2 | 1 | 1 |
| 56.25 | 9/16 | 9 | 7 |
| 62.5 | 10/16 = 5/8 | 5 | 3 |
| 68.75 | 11/16 | 11 | 5 |
| 75 | 12/16 = 3/4 | 3 | 1 |
| 81.25 | 13/16 | 13 | 3 |
| 87.5 | 14/16 = 7/8 | 7 | 1 |
| 93.75 | 15/16 | 15 | 1 |

NUMON represents an on-state counter value 312 which is loaded into a down counter 330 which provides a 4-bit modulo count during which the output of the duty cycle modulator will generate high level steps, whereas NUMOFF represents the off-state counter value 314 which is loaded into the down counter 330 during which the output of the duty cycle modulator will generate low level steps. The on-state counter value 312 and the off-state counter value 314 are applied to a selection circuit 320 which alternately selects from the on-state counter value 312 and the off-state counter value 314 to produce a 4-bit next count signal 325. The selection circuit 320 also receives a mode select signal 345 from a mode selector 340 which is a flip-flop which alternately selects a NUMON value and a NUMOFF value. The next count signal 325 is loaded into the down counter 330 on the next clock pulse generated by the reference clock signal 31, after which the down counter 330 counts down to zero which produces an end-of-count signal 335, which toggles the mode selector 340. The flip-flop 340 generates the mode select signal 345, described above, which enables the selection circuit 320 to output as the next count signal 325, the appropriate value selected between NUMON and NUMOFF. The mode selector 340 also generates the pulse-width modulated digital tone signal 35.

Figure 8:
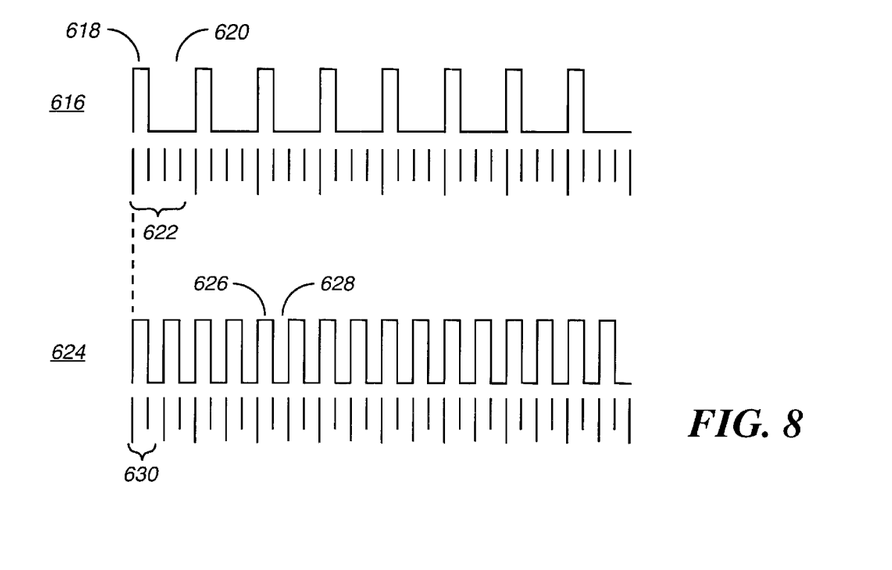
FIG. 8 is a timing diagram illustrating the operation of the adaptive pulse-width modulator of FIG. 7.

FIG. 8 shows the state of the pulse-width modulator output which provides a pulse-width modulated digital tone signal 35 as the composite DTMF tone data 33 varies from the desired 25% to 50% duty cycle, and the number of modulation steps is set at 16 which provides a pulse width resolution of 6.25% per modulation step. It will be understood that modulation steps other than 16 can be utilized depending upon the duty cycle resolution required. From Table II, when the composite DTMF tone data generated indicates a 25% duty cycle is required, the values of NUMON and NUMOFF are 1 and 3, respectively, and as shown in the timing diagram 616 the pulse-width modulator output will be high for one high level step 618, and low for three low level steps 620, for a period 622 of four steps. This allows an update to the pulse-width modulator output to be made once every four cycles of the reference clock signal 31 instead of once every sixteen clock cycles, as described above. Furthermore, when the composite DTMF tone data generated indicates a 50% duty cycle is required, the timing diagram 624 shows that the pulse-width modulator output will be high for one high level step 626, and low for one low level step 628, for a period 630 of two steps. As shown in Table II, the value of NUMON and NUMOFF vary from 1 and 15 to 15 and 1, and on average, the adaptive pulse-width modulator 700 generates more cycles of the pulse-width modulator output over the same time period, and is 1.5 times faster than the previous method described above. It will be appreciated that the more often the duty cycle can be adjusted in a given amount of time, the more accurate (less distorted) the pulse-width modulator output will be. This also allows the reference clock signal 31 that drives the pulse-width modulator to be slower than would be necessary for a conventional pulse-width modulator.

Figure 9:
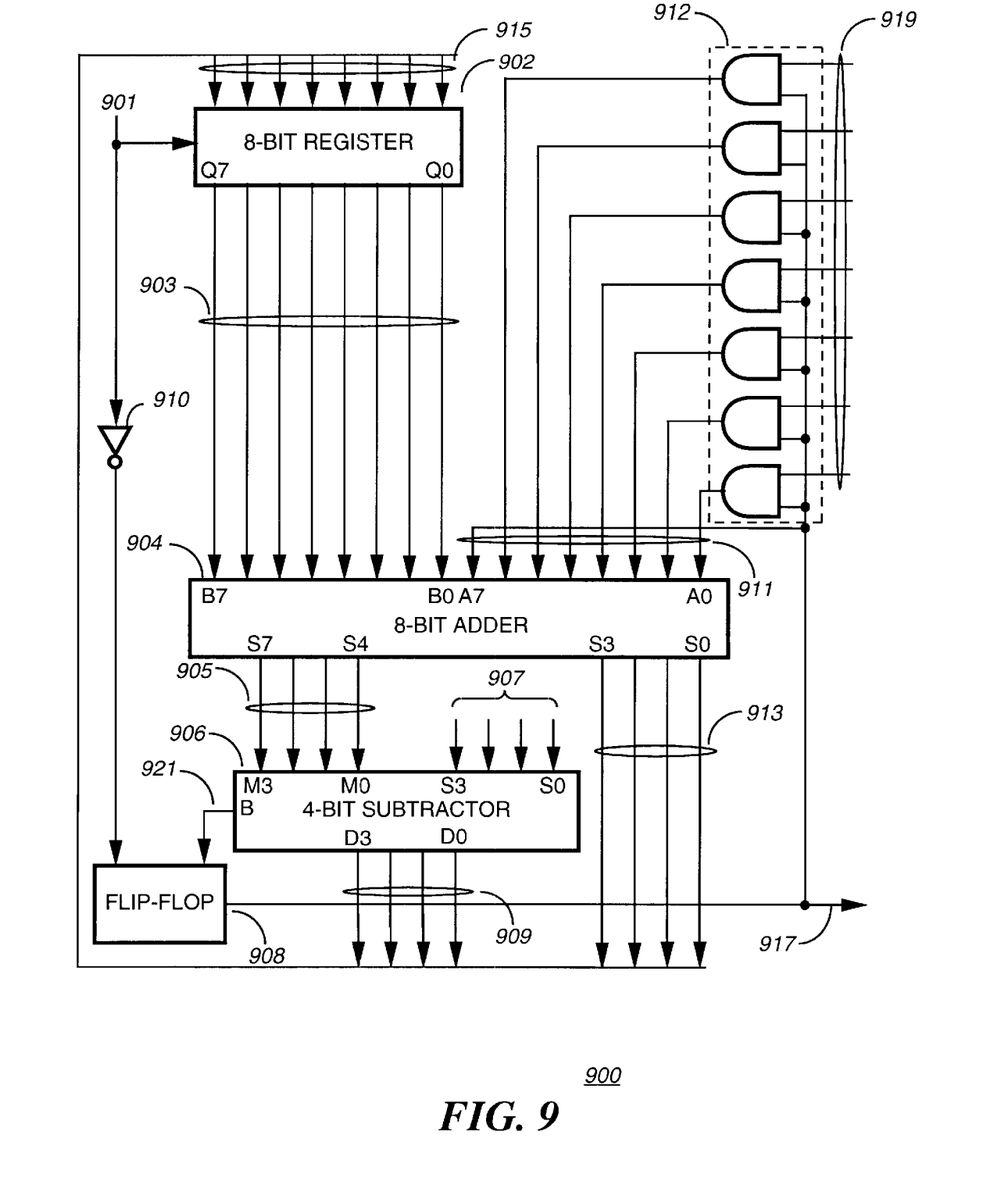
FIG. 9 is an electrical block diagram of a fractional divider suitable for implementing aspects of the present invention.

FIG. 9 is an electrical block diagram of a fractional divider 900 suitable for implementing the fractional divider 16 and fractional divider 22 of the present invention. Fractional dividers are less complex, provide sufficient tone resolution, and operate at reduced current drain as compared to a frequency synthesizer. For frequency accuracy, the low frequency clock 30 is preferably crystal controlled.

The fractional divider 900 is adapted from a dither generator for a single accumulator fractional N divider, such as used in fractional N synthesizers for RF applications. Rather than controlling a two-modulo prescaler, the dither signal itself becomes the divided output signal. This approach is used in implementing fractional divider 16 and fractional divider 22 as will be described further below.

Figure 10:
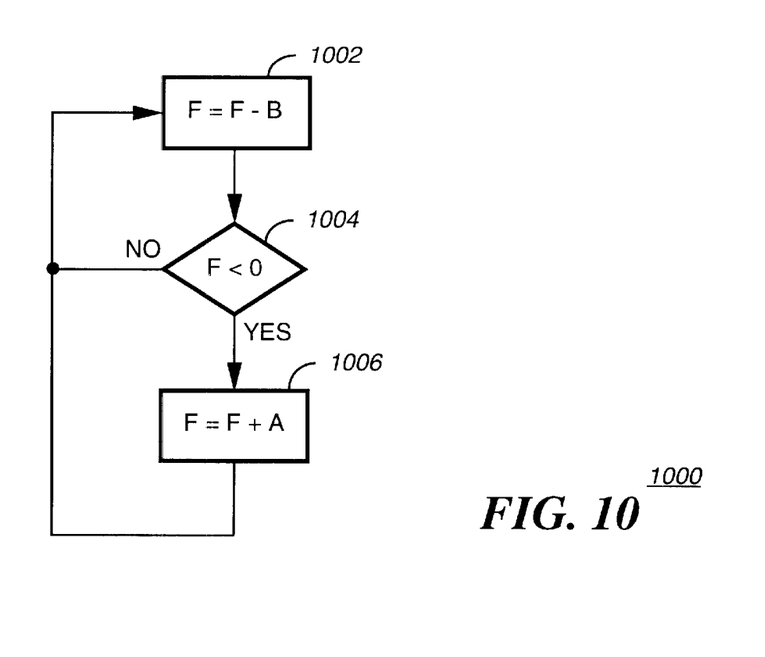
FIG. 10 is a flow chart depicting the operation of the fractional divider of FIG. 9.

An algorithm which represents the operation of fractional divider 16 and fractional divider 22 is shown in flowchart form in FIG. 10. Two integer variables x and y are introduced, where x represents the reference clock count and y represents the divided output cycle count. Two integer constants a and b are also introduced, where a/b is the fractional divide ratio. The following test function, adapted from the exact ratio y/x=b/a, is used to formulate the following algorithm:

$$f = ay - bx$$

x increments by one (reference clock cycle), at which time the value of b is subtracted from the current value of f, at step 1002. When f is greater than zero, at step 1004, x increments by one, at which time the value of b is subtracted from the current value of f, at step 1002, until such time as f becomes less than zero, at step 1006, at which point y is incremented by one (the output cycle), at which time the value of a is added to the current value of f, at step 1006. Step 1002 and step 1004 are again repeated until the value of f becomes less than zero, and the process repeats indefinitely. Since the value of f is kept near zero, the average divide ratio remains at the exact a/b.

Table III illustrates the relative parameters for the fractional divider 900 when used to generate DTMF tones in accordance with the present invention. For a low frequency clock 30, as described above, having a frequency of 614.4 KHz, and a 32-step sine table, the reference clock 901 would be at a frequency of 19.2 KHz (614.4 KHz/32).

TABLE III

| Tone | | Count | | | | Freq. |
|---|---|---|---|---|---|---|
| Hz | Divisor | Low | High | b | a | Hz |
| 697 | 27.5 | 27 | 28 | 8 | 220 | 698.2 |
| 770 | 24.9 | 24 | 25 | 8 | 199 | 771.1 |
| 852 | 22.5 | 22 | 23 | 8 | 180 | 853.3 |
| 941 | 20.4 | 20 | 21 | 8 | 163 | 941.2 |
| 1209 | 15.9 | 15 | 16 | 8 | 127 | 1207.5 |
| 1336 | 14.4 | 14 | 15 | 8 | 115 | 1333.3 |
| 1477 | 13.0 | 13 | 13 | 8 | 104 | 1476.9 |
| 1633 | 11.8 | 11 | 12 | 8 | 94 | 1627.1 |

As shown in Table II, seven DTMF tones utilized for phone number selection range in frequency from 679 Hertz (Hz) to 1477 Hz. An eighth tone at 1633 Hertz (Hz) can also be generated. The parameters of Table III are generated as follows:

Divisor=Reference Clock/Tone frequency (Hz)

Count Low is the low divisor generated by the fractional divider

Count High is the high divisor generated by the fractional divider b is a multiplier which sets the resolution of the fractional divider a=b×Divisor Freq. (Hz) is the actual tone frequency generated by the fractional divider.

As can be seen from Table III, the lowest tone frequency 697 Hz is readily accommodated using an 8-bit register and 8-bit adder (a=220 as compared to a maximum number of 256) It will be appreciated that greater resolution of the tone frequency can be obtained by increasing the value a b from 8 up to 15, however, at the expense of increasing the adder size.

Returning to FIG. 9, the fractional divider 900 in accordance with the present invention includes an 8-bit parallel input register 902 which stores the current binary value of "f" as described above. The current value of "f" is loaded into the 8-bit parallel input register 902 by a reference clock 901 which loads the value of "f" present on a 8-bit data bus 915. The output of the 8-bit parallel input register 902 is coupled to one input of an 8-bit adder 904 over an 8-bit data bus 903. The value of "a" listed in Table III is provided to a first input of an AND gate array 912 over a 7-bit data bus 919. A second input of the AND gate array 912 is coupled to the output 917 of the fractional divider 900 which delivers the divided tone output signal. The 7-bit output of the AND gate array 912 is coupled to a second input of the 8-bit adder 904 over seven of the eight lines of an 8-bit data bus 911. The eighth input of the 8-bit data bus 911 is coupled to the output 917 of the fractional divider 900. The four most significant bits of the 8-bit adder 904 are coupled to a first input of a 4-bit subtractor 906 over a 4-bit data bus 905. The value of "b" listed in Table III is provided to a second input of the 4-bit subtractor 906 over a 4-bit data bus 907. The output 909 of the 4-bit subtractor provides the four most significant bits of the 8-bit data bus 915 to the input of the 8-bit register 902, while the four least significant bits 913 of the 8-bit adder 904 are also coupled to the input of the 8-bit parallel input register 902 through the remaining four lines of the 8-bit data bus 915. The borrow output 921 of the 4-bit subtractor 906 couples to one input of a flip-flop 908, the output of which generates a squared up version of the divided tone signal. The reference clock also couples to an input of an inverter 910. The output of the inverter 910 couples to the second input of the flip-flop 908, toggling the flip-flop 908 each time a borrow output 921 is generated by the 4-bit subtractor.

In summary, a dual tone frequency generator was described above which utilizes a fractional divider, an index counter, and a ROM sine table to generate stepped digital data representations of a sine wave at the low and high DTMF tone frequencies. The stepped digital data representations of the low and high DTMF tone frequencies are added in a digital adder after which the result is processed by a pulse width modulator. A conventional pulse width modulator can be utilized, and where necessary, when distortion must be minimized, the adaptive pulse width modulator described above can be utilized. The output of the pulse width modulator is processed by a digital driver which applies the pulse width modulated digital representations of the low and high DTMF tones to a transducer. The transducer, acting as a low pass filter, eliminates the high frequency signal components introduced during pulse width modulation, thereby producing analog audio tones corresponding to the DTMF tones being digitally generated.

Figure 11:
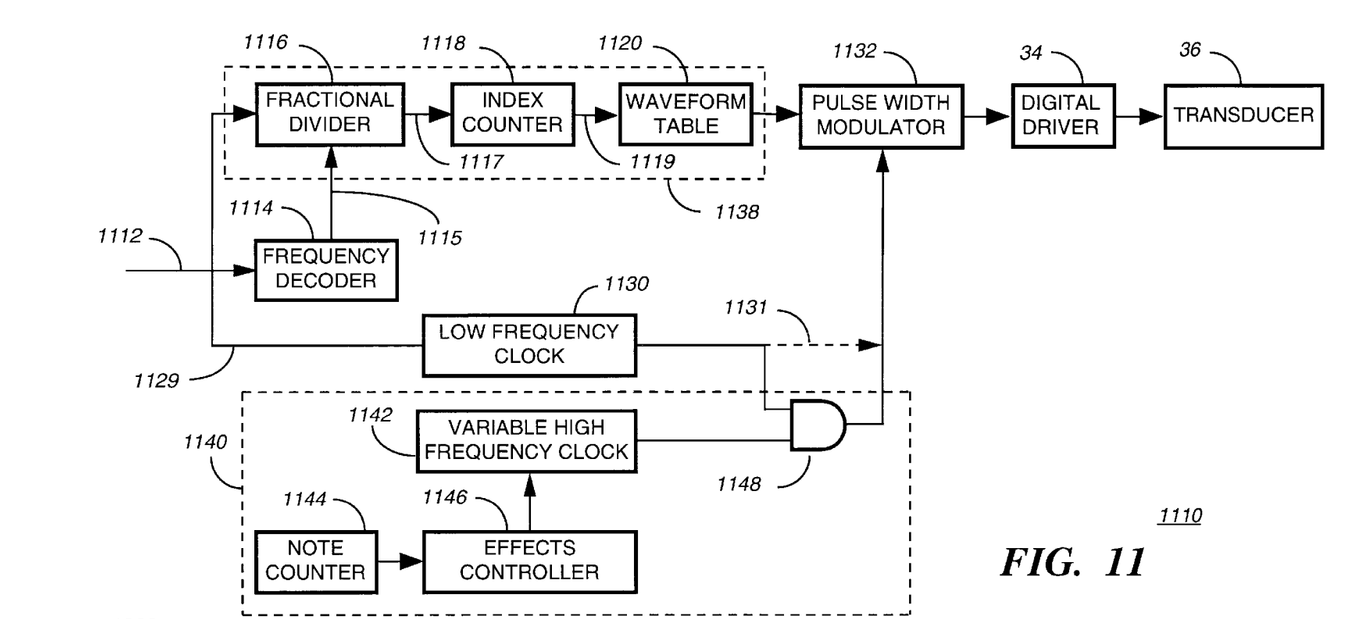
FIG. 11 is an electrical block diagram of a digital tone generator capable of generating multi-frequency tones in accordance with the present invention.

FIG. 11 is a block diagram of a digital tone generator 1110 capable of generating multi-frequency tones in accordance with the present invention. A digital signal generator 1138 produces digital waveform data sequences which represent tones to be generated having predetermined wave forms. A reference clock signal 1129 operating, by way of example, at 614.4 kilohertz (KHz) is used as a time base for the digital multi-frequency tone generator 1110, and is applied to the input of the digital signal generator 1138. The reference clock signal 1129 is applied directly to a fractional divider 1116. The fractional divider 1116 divides the reference clock signal 1129 to generate an index clock 1117 which is representative of a tone to be generated, and which is coupled to an index counter 1118. A micro-controller (not shown) supplies a frequency select signal 1112 to the fractional divider 1116 for programming the divide ratio required to generate the proper tone frequency at the outputs of the fractional divider 1116. The index counter 1118 is preferably a 5-bit modulo counter, which can be preset to divide by five or have a programmable divide ratio, dividing from 2 to 32. The index counter 1118 generates a predetermined sequence of addresses 1119 which are used to address a waveform generator comprising a ROM waveform table 1120. The ROM waveform table 1120, as it is addressed, generates data representing amplitude levels for a digital waveform data sequence signal. The digital waveform data sequence can be representative of a square wave generated at the index clock frequency using a predetermined sequence of addresses including two addresses to access two amplitude levels; a digitized sine wave represented by five bit frequency tone data, such as depicted and previously described in FIG. 4; or other wave forms, such as a sawtooth or triangular waveform, described by n-bit frequency data depicting a suitable number of amplitude levels. An example of the ROM sine table data was shown by way of example in Table 1 above. It will be appreciated that when the waveform being generated is a square wave, the divide ratio of the index counter would be set to two, and can be coupled to the ROM waveform table 1120, or directly coupled to the pulse-width modulator 1132.

The output of the ROM waveform table 1120 is coupled to a pulse-width modulator 1132 which is clocked, in a first embodiment, directly by the low frequency clock signal 1131. The pulse-width modulator 1132 transforms the digital waveform data sequence signal into a pulse-width modulated signal having a constant amplitude which exhibits a pulse width that varies in accordance with the digital waveform data sequence as described above The manner by which the pulse-width modulator 1132 transforms the digital waveform data sequence into the pulse width modulated digital tone signals using the low frequency clock signal was also described in detail above.

The output of the pulse-width modulator 1132 is coupled to a digital driver 1134 which processes the pulse width modulated digital tone signals, providing an output which is suitable to drive a transducer 1136. The transducer 1136 is preferably an electromagnetic transducer having a limited frequency range, such as described above.

By way of example, the digital tone generator described above can be utilized to generate 64 discrete frequencies between 2000 Hz and 4000 Hz. This would require divisors of 15⅞, 15¾, 15⅝ . . . , 8¼, 8⅛, and 8, and would utilize a 32 KHz reference clock source which is readily derived from the 614.4 KHz low frequency clock 1130. Other tone frequency ranges and tones can be generated by varying the reference clock source frequency and the divisors of the fractional dividers.

In summary, a digital tone generator was described above which can generate a digital waveform data sequence which is representative of a selected tone frequency. The digital waveform data sequence can be that of a square wave, a digitized sine wave, or other digitized waveform. The digital waveform data sequence can be processed by a pulse width modulator, and further processed by a digital driver circuit. When the modulated digital tone signal provided at the output of the digital driver is coupled to a transducer, an analog tone signal results.

Figure 12:
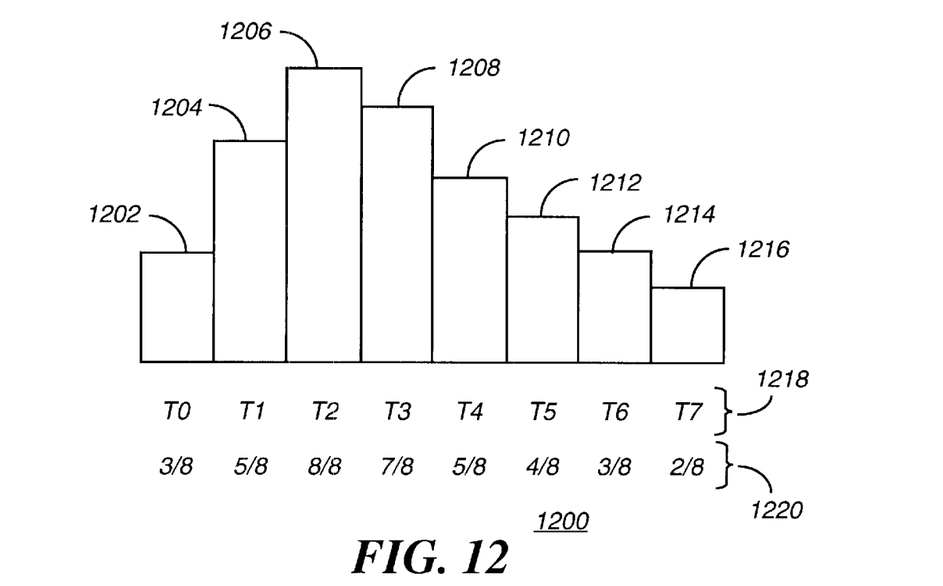
FIG. 12 is a timing diagram illustrating aspects of the operation of the multi-frequency tone generator of FIG. 11.

Referring further to FIG. 11, a digital effects generator 1140 can be added to the digital tone generator 1110. The digital effects generator 1140 enables the tone generated by the digital multi-frequency tone generator 1110 to more accurately mimic the effect of real instruments, by generating a note envelope 1200, such as shown in FIG. 12 to be applied to the tone signal generated by the digital tone generator 1110. When the digital effects generator 1140 is utilized, the low frequency clock signal 1131 is coupled to the first input of an AND gate 1148. A note counter 1144, to be described below is coupled to an effects controller 1146. The output of the effects controller 1146 is coupled to a variable high frequency clock 1142. The output of the variable high frequency clock 1142 is coupled to the second input of the AND gate 1148.

In operation, the note counter 1144 breaks any length note into a sequence of counts representing a duration of a note, by way of example into eight equal length pieces, shown in FIG. 12 which denote note counter values 1218, labeled T0 through T7. Thus a quarter note is broken into eight equal length pieces (each is ¹⁄₃₂ of a whole note long) which correspond to note counter intervals 1202–1216. By breaking every note into note counter intervals 1202–1216, the attack and decay of a musical note can be mimicked, thus producing sounds which sound more like a real instrument. As shown by way of example in FIG. 12, the note envelope 1200 has a fast attack during the first three counts of the note counter 1144, corresponding to note counter intervals 1202–1206, and a slow decay during the remaining five counts of the note counter 1144, corresponding to note counter intervals 1208–1216. It will be appreciated that the resolution by which each note can be broken into equal lengths can be increased to provide improved sound realism, or decreased with a resultant decrease in sound generation realism.

The effects controller 1146 generates the actual note envelope by controlling the frequency of the variable high frequency clock 1142 for each note counter count. The output of the variable high frequency clock, when AND'ed with the fixed low frequency clock, produces a clock signal at the output of AND gate 1148 which varies the frequency modulation effects of the pulse-width modulator 1132 and which results in an apparent increase and/or decrease in the volume of the tone signal being generated during each note count. The duty cycle 1220 generated during each of the note counter intervals 1202–1216 are shown by way of example in FIG. 12. It will be appreciated that an ⅝ duty cycle represents full volume, and a ⅛ duty cycle represents minimum volume. The note can also be modulated to produce reverb effects by increasing and decreasing the "volume" within the length of a single note. Since control of the note envelope 1200 provided by the digital effects generator 1140 is independent of the tone frequency being generated by the digital tone generator 1110, the effects generated apply equally to all frequencies being generated.

In summary, a digital effects generator was described above which includes a note counter which generates a sequence of counts representing a note period, and each count within the sequence of counts corresponds to a portion of the note period. An effects controller is responsive to the sequence of counts for recovering amplitude information from an effects table stored in a read only memory. The amplitude information includes a sequence of note envelope amplitude values which control the generation of the note envelope over the note period. A variable frequency clock is responsive to a sequence of note amplitude values for generating a sequence of variable frequency clock signals which correspond to the note amplitude values. A pulse-width modulator has a tone input for receiving a tone which corresponds in frequency to the note to which the digital effects are being applied. The pulse-width modulator is responsive to the sequence of variable frequency clock signals for encoding the tone to generate a pulse-width modulated digital tone having controlled envelope characteristics.

Figure 13:
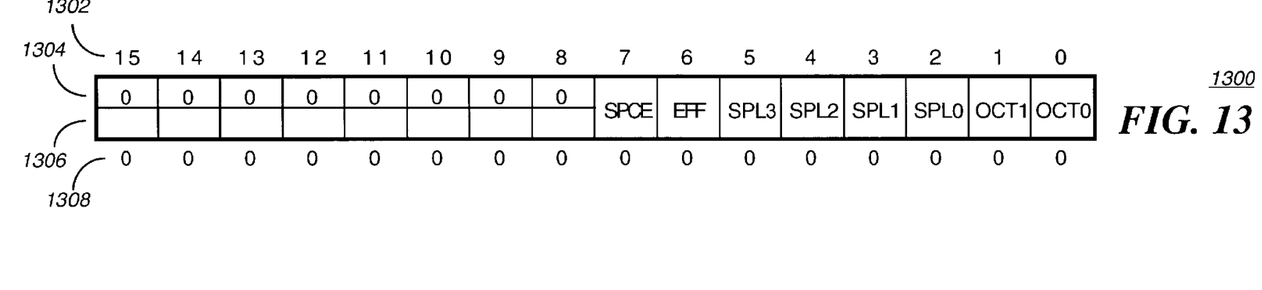
FIG. 13 is a diagram depicting the contents of the sound pressure level control register implementing a digital effects generator in accordance with the present invention.

In the preferred embodiment of the present invention, the digital tone generator 1110 and the digital effects generator 1140 can be implemented using a microcomputer. With respect to the digital effects generator 1140, a sound pressure level control register (SPLCR) is established as a four byte FIFO buffer, shown in FIG. 13, and a NOTE control register (NCR) is established as a four byte FIFO buffer. The organization of the SPLCR register 1300 is shown in FIG. 13.

The SPLCR register 1300 is by way of example sixteen bits long, denoted by offset locations 1302. The offset locations 1302, designated 15 through 8 can only be read to, and are denoted as read elements 1304. The offset locations 1302, designated 7 through 0 which can be written to, and are denoted as write elements 1306, and can also be read from and are denoted as read elements 1304. When the SPLCR register 1300 is reset, each bit 1308 of the SPLCR register is set to zero.

The SPCE bit (SPACE bit) controls whether or not a note will be played for the entire note length. This functionally allows a beat tone to be added which is audible and separates different notes. A "1" denotes the note is played for 7/8 of a note length followed by a 1/8 note length pause. A "0" denotes the full length note is played.

The EFF (Effect) bit enables the effects controller 1146, which recovers amplitude information comprising a sequence of note amplitudes T0 through T7, which control the generation of the note envelope, thereby controlling the sound pressure level (SPL) during each of the 8 equal length time segments of the note, shown as T0 through T7 in Table IV which provides example effects which can be provided.

TABLE IV

| Effect | Relative Effective Volume | | | | | | |
| --- | --- | --- | --- | --- | --- | --- | --- |
|  | T0 | T1 | T2 | T3 | T4 | T5 | T6 | T7 |
| Loud 1 | 1 | 15 | 14 | 1 | 9 | 1 | 5 | 1 |
| Loud 2 | 2 | 4 | 6 | 9 | 12 | 15 | 11 | 6 |
| Loud 3 | 5 | 11 | 15 | 14 | 11 | 8 | 4 | 2 |
| Loud 4 | 4 | 9 | 12 | 10 | 13 | 11 | 15 | 6 |
| Loud 5 | 4 | 9 | 11 | 15 | 15 | 11 | 9 | 4 |
| Soft 1 | 1 | 7 | 7 | 1 | 5 | 1 | 3 | 1 |
| Soft 2 | 1 | 2 | 3 | 5 | 6 | 7 | 5 | 3 |
| Soft 3 | 3 | 5 | 7 | 6 | 5 | 3 | 2 | 1 |
| Soft 4 | 1 | 3 | 5 | 4 | 6 | 5 | 7 | 3 |
| Soft 5 | 2 | 4 | 6 | 7 | 7 | 6 | 4 | 2 |

The SPL effect is identified by the four bits labeled SPL3–SPL0 which select by way of example ten predetermined effects. It will be appreciated that the predetermined effects can be effects that are user defined, as well. When no effects are selected for the time intervals T0 through T7, the note is reproduced at maximum volume.

Two additional bits, OCT1 and OCT0 can be used to control the tone scale octave for the tones being generated. As a result, tunes scaling a number of octaves can be readily generated. When the additional OCT1 and OCT0 bits are utilized, an octave counter (not shown) is introduced between the fractional divider 1116 and the index counter 1118. The octave counter is preferably a 2-bit counter which can be preset to any of four division values. As a result, the division ratio of the fractional dividers can be reduced by a factor of four.

The next value in the SPLCR register FIFO is used by the effects controller 1146 whenever a new note value is selected from the NOTE register FIFO. When no new values are available in the SPLCR register when a new note is selected, the last SPLCR register value will remain active. The SPLCR register FIFO and the NOTE register FIFO may not be automatically synchronized together, therefore the SPLCR register FIFO must be updated each time the NOTE register FIFO is updated. When only a single value is written to the SPLCR register FIFO, the effects controller 1146 will use that value all the time.

Figure 14:
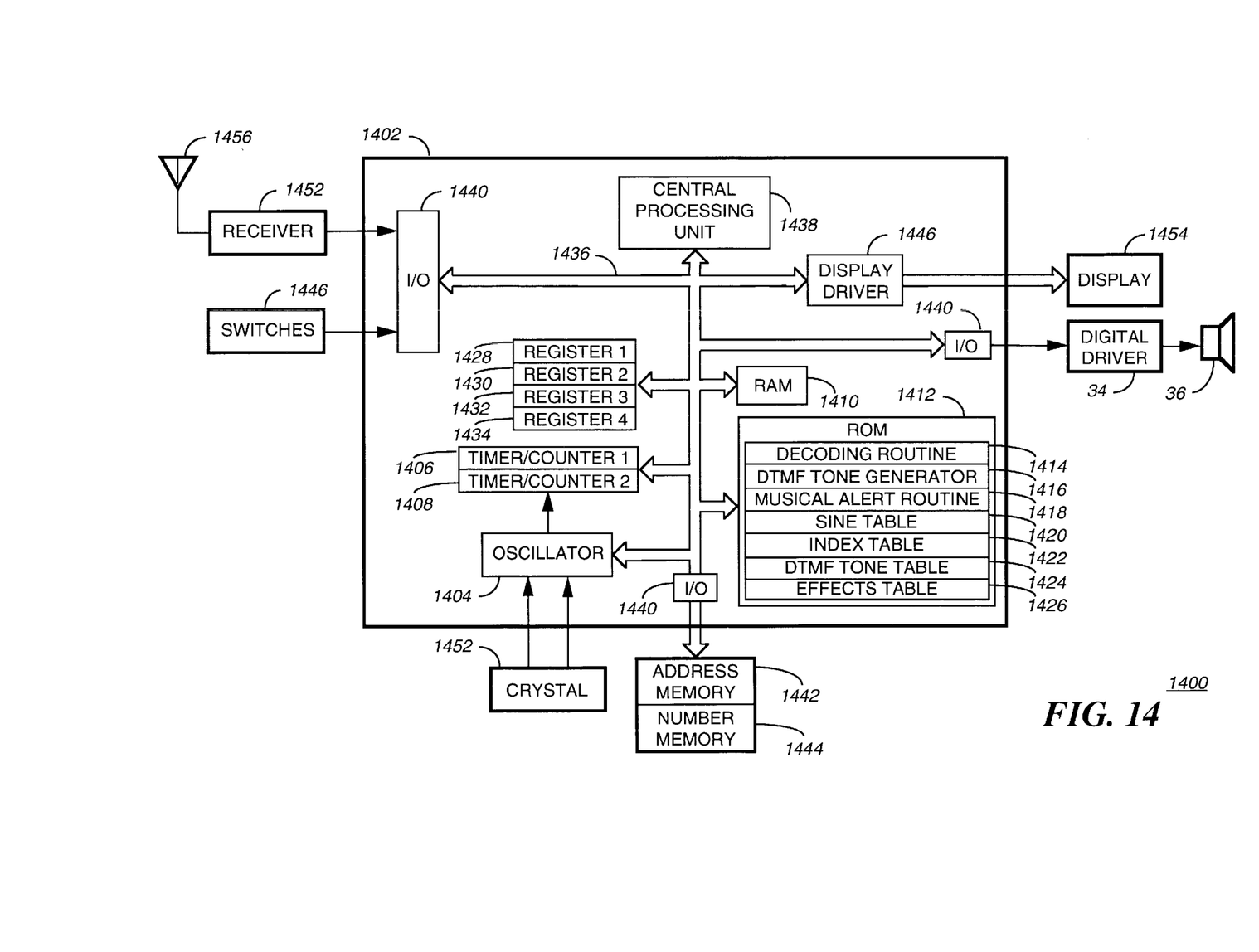
FIG. 14 is an electrical block diagram of an electronic device in accordance with the present invention.

FIG. 14 shows an electrical block diagram of an electronic device 1400 which can utilize the digital tone generator 1110 to generate an alert, and when combined with the effects generator 1140 can generate a musical alert in accordance with the present invention. The electronic device 1400 can also utilize the DTMF tone generator 10, and the adaptive pulse-width modulator 700 to generate telephone dialing signals in accordance with the present invention. When configured as a selective call receiver, the electronic device 1400 would include a microcomputer 1402 which can be utilized as a controller/decoder in a the selective call receiver. As shown, the microcomputer 1402 is preferably an MC68HC08 microcomputer, such as manufactured by Motorola, Inc. The microcomputer 1400 includes an oscillator 1404 which generates timing signals utilized in the operation of the microcomputer. A crystal 1452, or crystal oscillator (not shown) is coupled to the inputs of the oscillator 1404 to provide a reference signal for establishing the microcomputer timing. One or more timer/counters, such as timer/counter 1406 and timer/counter 1408 couple to the oscillator 1404 and provide programmable timing functions which are utilized in controlling the operation of the receiver, and can be utilized to implement, among other things, the fractional dividers described above. A RAM (random access memory) 1410 is utilized to store variables derived during processing, as well as to provide storage of message information which is received during operation as a selective call, or paging receiver. The message information can include phone numbers as well as alphanumeric messages.

A ROM (read only memory) 1412 stores the subroutines which control the operation of the receiver. These subroutines include by way of example, a decoding routine 1414 for decoding selective call messages which are received in a manner well known in the art. A DTMF generator routine 1416 controls the generation of DTMF tones, so as to provide an automatic phone number dialer. A musical alert routine 1418 controls the generation of musical alerts announcing a selective call message has been received. A sine table 1420 is provided which stores information necessary to generate the digital sine wave values shown in Table I above. An index table 1422 stores information necessary to generate the pulse-width modulation, including the on-state and off-state counter values listed in Table II above which are used to implement the adaptive pulse-width modulator 700. A DTMF tone table 1424 stores information necessary for the fractional dividers to generate the various low frequency and high frequency DTMF tones, such as listed in Table III above. An effects table 1426 stores information necessary for generating the effects provided by the musical alert routine 1418, and includes such information as listed in Table IV above. Index registers, such as register 1428, register 1430, register 1432, and register 1434 can be utilized to provide the modulo counters utilized for the index counter 18 and index counter 24, the 4-bit counter 210, the 4-bit modulo down counter 330, the 8-bit register 902, and the note counter 1144, such as described above.

The oscillator 1404, timer/counter 1406, timer/counter 1408, RAM 1410, ROM 1412, register 1428, register 1430, register 1432, and register 1434 couple through an address/data/control bus 1436 to a central processing unit (CPU) 1438 which performs the instructions and controls the operations of the microcomputer 1402.

When the microcomputer decoder/controller 1402 is utilized in a selective call receiver, the demodulated data from a receiver 1452 is coupled into the microcomputer 1402 through input/output (I/O) bus 1440. The demodulated data is process by a CPU 1438, and when the received data is the same as an address stored in the address memory 1442 which couples into the microcomputer 1402 through I/O bus 1440, the message, if any, is received and stored in RAM 1410. Recovery of the stored message is provided by switches 1446 which are coupled to I/O port 1440. The microcomputer 1402 recovers the stored message from RAM 1410, and directs the information over the data bus 1436 to a display driver 1446 which processes the information and formats the information for display by a display such as an LCD (liquid crystal display). In the case of a phone number, the microcomputer 1402 recovers a phone number stored in RAM 1410, which can be displayed in a normal manner, or the phone number can be processed to generate pulse-width modulated DTMF tone data, as described above. The pulse-width modulated DTMF tone data is coupled through the I/O bus 1440 to a digital driver 34, as described above. At the time a paging address is received, an alert signal is generated which can also be routed through the I/P bus 1440 to the digital driver 34. As described above, the pulse-width modulated data signals are transformed by the action of the transducer 36 into an analog tone signal.

Phone numbers can also be stored in a number memory 1444 and recalled by means of switches 1446. When more than one phone number is stored, the phone number and associated name can be displayed on the display, and then the phone number auto dialed, as described above.

What is claimed is:

1. A digital tone generator, comprising:
    a digital signal generator for generating a digital waveform data sequence which is representative of a tone having a predetermined waveform; and
    an adaptive duty cycle pulse-width modulator which is responsive to the digital waveform data sequence being generated for generating an adaptive duty cycle period characterized by a pulse-width modulated digital tone signal having a variable frequency and duty cycle which is generated by selecting a variable number of clock pulses of a predetermined reference clock.

2. The digital tone generator of claim 1, further comprising
    a low pass filter for processing the pulse-width modulated digital tone signal to generate an analog tone signal.

3. The digital tone generator of claim 2, wherein said low pass filter is characteristic of a transducer.

4. A digital tone generator of claim 1, wherein said digital signal generator comprises:
    a fractional divider for fractionally dividing a reference clock frequency to generate an index clock representative of the tone to be generated;
    an index counter, responsive to the index clock, for generating a predetermined sequence of addresses; and
    a waveform generator, responsive to the predetermined sequence of addresses for generating the digital waveform data sequence which is representative of the tone having the predetermined waveform.

5. The digital tone generator of claim 4 wherein the predetermined sequence of addresses includes at least two addresses.

6. The digital tone generator of claim 5, wherein said digital tone generator generates a square wave when the predetermined sequence of addresses includes two addresses.

7. The digital tone generator of claim 5, wherein said digital tone generator generates a sine wave when the predetermined sequence of addresses includes at least thirty-two addresses.

8. A digital DTMF tone generator, comprising:
    a first digital signal generator for generating a first digital waveform data sequence which is representative of a high DTMF tone having a predetermined waveform;
    a second digital signal generator for generating a second digital waveform data sequence which is representative of a low DTMF tone having a predetermined waveform;
    a digital adder for adding the first digital waveform data sequence and the second digital waveform data sequence to derive a composite DTMF tone data sequence; and
    an adaptive duty cycle pulse-width modulator which is responsive to the composite DTMF tone data sequence being generated for generating a pulse-width modulated DTMF tone signal having a variable frequency and duty cycle which is generated by selecting a variable number of clock pulses of a predetermined reference clock frequency.

9. The digital DTMF tone generator of claim 8 further comprises
    a low pass filter for processing the pulse-width modulated DTMF tone data to generate an analog DTMF tone signal.

10. The digital DTMF tone generator of claim 8, wherein said first digital signal generator comprises:
    a first fractional divider for fractionally dividing a reference clock frequency to generate an index clock representative of the high DTMF tone to be generated;
    a first index counter, responsive to the index clock, for generating a first predetermined sequence of addresses; and
    a first waveform generator, responsive to the first predetermined sequence of addresses for generating the first digital waveform data sequence which is representative of the high DTMF tone having the predetermined waveform.

11. The digital DTMF tone generator of claim 10, wherein said first waveform generator is a first read only memory based sine table.

12. The digital DTMF tone generator of claim 10 wherein said first predetermined sequence of addresses includes thirty-two addresses.

13. The digital DTMF tone generator of claim 8, wherein said second digital signal generator comprises:
    a second fractional divider for fractionally dividing a reference clock frequency to generate an index clock representative of the low DTMF tone to be generated;
    a second index counter, responsive to the index clock, for generating a second predetermined sequence of addresses; and
    a second waveform generator, responsive to the second predetermined sequence of addresses for generating the second digital waveform data sequence which is representative of the low DTMF tone having the predetermined waveform.

14. The digital DTMF tone generator of claim 13, wherein said second waveform generator is a second read only memory based sine table.

15. The digital DTMF tone generator of claim 13, wherein said second predetermined sequence of addresses includes thirty-two addresses.

16. The digital DTMF tone generator of claim 8 wherein said adaptive duty cycle pulse-width modulator comprises:
    a counter, responsive to a reference clock signal for periodically generating a predetermined sequence of counts; and a comparator, responsive to the predetermined sequence of counts for pulse-width encoding the composite DTMF tone data sequence.

17. The digital DTMF tone generator of claim 16, wherein said adaptive duty cycle pulse-width modulator encodes the composite DTMF tone data sequence in accordance with $$1 = SPL >= Counter$$
$$0 = SPL < Counter$$

where SPL represents sound pressure level (SPL), and Counter represents the predetermined sequence of.

18. The digital DTMF tone generator of claim 8, wherein said adaptive duty cycle pulse-width modulator comprises:

an index table, for storing a table of on-state counter values and off-state counter values which are selected in accordance with the composite DTMF tone data sequence;

a selection circuit, responsive to a mode selection signal, for alternately selecting an on-state counter value and off-state counter value from said table of on-state counter values and off-state counter values;

a counter, responsive to a reference clock, for providing a count representing the on-state counter value and off-state counter value selected, and in response thereto for generating an end-of-count signal; and a mode selector, responsive to the end-of-count signal, for generating the mode selection signal.

19. The digital DTMF tone generator of claim 18, wherein said counter is a down-counter, and wherein said down-counter generates the end-of-count signal when the count equals zero.

* * * * *